United States Patent [19]

Altschul et al.

[11] Patent Number: 5,983,094
[45] Date of Patent: Nov. 9, 1999

[54] WIRELESS TELEPHONE WITH CREDITED AIRTIME AND METHOD

[75] Inventors: Randice-Lisa Altschul, Cliffside Park; Lee S. Volpe, Collingswood, both of N.J.

[73] Assignee: Randice-Lisa Altschul, Cliffside Park, N.J.

[21] Appl. No.: 08/958,120

[22] Filed: Oct. 27, 1997

[51] Int. Cl.⁶ ........................................... H04Q 7/32
[52] U.S. Cl. ............................... 455/413; 395/214
[58] Field of Search ..................... 455/453, 413; 395/219

[56] References Cited

U.S. PATENT DOCUMENTS

| | | |
|---|---|---|
| D. 340,714 | 10/1993 | Hoffman . |
| D. 369,167 | 4/1996 | Hanson et al. . |
| 4,776,000 | 10/1988 | Parienti . |
| 4,783,799 | 11/1988 | Maass . |
| 4,831,647 | 5/1989 | D'Avello et al. . |
| 4,856,046 | 8/1989 | Streck et al. . |
| 4,881,254 | 11/1989 | Hollewed et al. . |
| 4,916,441 | 4/1990 | Gombrich . |
| 4,951,308 | 8/1990 | Bishop et al. . |
| 5,138,650 | 8/1992 | Stahl et al. . |
| 5,161,250 | 11/1992 | Ianna et al. . |
| 5,220,593 | 6/1993 | Zicker et al. . |
| 5,225,969 | 7/1993 | Takaya et al. . |
| 5,233,642 | 8/1993 | Renton . |
| 5,301,223 | 4/1994 | Amadon et al. . |
| 5,307,508 | 4/1994 | Rollins et al. . |
| 5,327,382 | 7/1994 | Yamamoto . |
| 5,359,182 | 10/1994 | Schilling . |
| 5,365,570 | 11/1994 | Boubelik . |
| 5,376,931 | 12/1994 | Marrs . |
| 5,379,193 | 1/1995 | Gall et al. . |
| 5,388,148 | 2/1995 | Seiderman . |
| 5,423,080 | 6/1995 | Perret et al. . |
| 5,438,612 | 8/1995 | Norimatsu . |
| 5,461,664 | 10/1995 | Cappadona . |
| 5,504,808 | 4/1996 | Hamrick, Jr. . |
| 5,509,196 | 4/1996 | Davis et al. . |
| 5,511,114 | 4/1996 | Stimson et al. . |
| 5,517,555 | 5/1996 | Amadon et al. . |
| 5,541,985 | 7/1996 | Ishii et al. . |
| 5,550,897 | 8/1996 | Seiderman . |
| 5,558,928 | 9/1996 | DeStefano et al. . |
| 5,563,934 | 10/1996 | Eda . |
| 5,577,100 | 11/1996 | McGregor et al. . |
| 5,577,109 | 11/1996 | Stimson et al. . |
| 5,579,379 | 11/1996 | D'Amico et al. . |
| 5,583,918 | 12/1996 | Nakagawa . |
| 5,592,537 | 1/1997 | Moen . |
| 5,608,778 | 3/1997 | Partridge, III . |
| 5,610,973 | 3/1997 | Comer ..................................... 455/413 |
| 5,615,087 | 3/1997 | Wieloch . |
| 5,615,260 | 3/1997 | Kurgan . |
| 5,621,787 | 4/1997 | McKoy et al. . |

(List continued on next page.)

FOREIGN PATENT DOCUMENTS

| | | |
|---|---|---|
| 2262685 | 6/1993 | United Kingdom . |
| 9216078 | 9/1992 | WIPO . |
| 9603001 | 2/1996 | WIPO . |

*Primary Examiner*—William Cumming
*Attorney, Agent, or Firm*—Arthur Jacob

[57] ABSTRACT

A wireless telephone for telephonic communications during subscribed periods of airtime and for the purchase of selected goods and services in purchase amounts is responsive to the purchase amounts so as to enable the purchase amounts to be converted to additional periods of airtime during which telephonic communications are enabled independent of the subscribed periods of airtime. A method of using a wireless telephone for telephonic communications during subscribed periods of airtime and for the purchase of selected goods and services in purchase amounts enables the purchase amounts to be converted to additional periods of airtime during which telephonic communications are enabled independent of the subscribed periods of airtime. Preferably the purchase amounts are placed through a purchase account and are converted to additional periods of airtime in proportion to the purchase amounts.

15 Claims, 5 Drawing Sheets

U.S. PATENT DOCUMENTS

| | | |
|---|---|---|
| 5,625,669 | 4/1997 | McGregor et al. . |
| 5,627,886 | 5/1997 | Bowman . |
| 5,629,977 | 5/1997 | Fonseca . |
| 5,631,947 | 5/1997 | Wittstein et al. . |
| 5,673,306 | 9/1997 | Amadon et al. . |
| 5,673,309 | 9/1997 | Woynoski et al. . |
| 5,675,636 | 10/1997 | Gray . |
| 5,677,945 | 10/1997 | Mullins et al. . |
| 5,684,861 | 11/1997 | Lewis et al. . |
| 5,729,693 | 3/1998 | Holda-Fleck ............................ 395/214 |

WIRELESS TELEPHONE WITH CREDITED AIRTIME AND METHOD

BACKGROUND OF THE INVENTION

Field of the Invention

The present invention relates generally to wireless telephonic communication and pertains, more specifically, to wireless telephones and method through which the amount of paid airtime available through a wireless telephone is increased selectively and, in particular, is increased in proportion to the purchase amounts of selected purchases of goods and services through a purchase account, such as a credit card account.

The advent of cellular telephones has made wireless telephonic communication available to a rapidly growing number of purchasers of telephone equipment and services. Various proposals for related services and equipment have been suggested in efforts to widen the audience for wireless telephones and services.

BRIEF SUMMARY OF THE INVENTION

The present invention combines the versatility and convenience of using purchase accounts, such as credit card accounts, for the purchase of goods and services with making additional amounts of airtime available to wireless telephone users without concomitant additional expense, thereby enabling a synergistic use of purchase accounts and wireless telephonic services. In addition, the present invention enables the convenient use of pre-paid periods of airtime in connection with wireless telephonic communication, as effected through the wireless telephone itself. As such, the present invention attains several objects and advantages, some of which are summarized as follows: Combines the convenience and versatility of credit card use with the use of wireless telephonic communications; provides wireless telephone users with increased airtime in proportion to the use of purchase accounts, such as credit card accounts, for the purchase goods and services; enables more convenience and increased versatility in the use of wireless telephonic equipment, with lower cost; encourages the purchase of goods and services through the use of credit or debit accounts by conveniently crediting added airtime for wireless telephonic communications in proportion to such credit or debit account purchases; reduces the number of separate devices carried by consumers having credit card accounts and wireless telephones by combining the capabilities of a wireless telephone and a credit card into a single, conveniently carried device; reduces the cost to consumers of wireless telephonic communications; makes available the use of wireless telephonic communications to a wider audience of consumers and, in particular, to consumers already accustomed to using credit purchase accounts; enables the convenient use of pre-paid periods of airtime in connection with wireless telephonic communications; fosters the growth of commerce in goods and services, with increased communication through wireless communication services.

The above objects and advantages, as well as further objects and advantages, are attained by the present invention which may be described briefly as a wireless telephone for telephonic communications during subscribed periods of airtime and responsive to making selected purchases of goods and services in purchase amounts placed through a purchase account and for enabling the purchase amounts made through the purchase account to be converted to additional periods of airtime during which telephonic communications are enabled independent of the subscribed periods of airtime, the telephone comprising: telephonic means for transmitting and receiving telephonic communications; input means for entering information pertaining to a purchase amount of a selected purchase; confirming means for confirming placement of the purchase amount in the purchase account; and converting means responsive to the confirming means for converting the purchase amount confirmed by the confirming means to an additional period of airtime, in proportion to the purchase amount of the selected purchase, during which additional period of airtime telephonic communication is enabled independent of the subscribed periods of airtime.

In addition, the present invention includes method of using a wireless telephone for telephonic communications during subscribed periods of airtime and for making selected purchases of goods and services in purchase amounts placed through a purchase account, the method enabling the purchase amounts of the selected purchases to be converted to additional periods of airtime during which telephonic communications are enabled independent of the subscribed periods of airtime, in response to making the selected purchases, the method comprising: providing telephonic means for transmitting and receiving telephonic communications; placing a purchase amount in the purchase account; entering information pertaining to a purchase amount of a selected purchase; confirming placement of the information pertaining to the purchase amount in the purchase account; converting the purchase amount, confirmed as having been placed in the purchase account, to an additional period of airtime, in proportion to the purchase amount; and enabling the telephonic means for telephonic communications during the additional period of airtime, independent of the subscribed periods of airtime.

Further, the present invention is directed to a wireless telephone for telephonic communications during subscribed periods of airtime and responsive to purchase amounts so as to enable the purchase amounts to be converted to additional periods of airtime during which telephonic communications are enabled independent of the subscribed periods of airtime, the telephone comprising: telephonic means for transmitting and receiving telephonic communications; purchase amount means for entering information pertaining to a purchase amount; and converting means responsive to the purchase amount means for converting the information pertaining to the purchase amount to an additional period of airtime during which additional period of airtime telephonic communication is enabled independent of the subscribed periods of airtime.

Still further, the present invention is concerned with a method of using a wireless telephone for telephonic communications during subscribed periods of airtime and responsive to purchase amounts so as to enable the purchase amounts to be converted to additional periods of airtime during which telephonic communications are enabled independent of the subscribed periods of airtime, the method comprising: providing telephonic means for transmitting and receiving telephonic communications; entering information pertaining to a purchase amount; converting the information pertaining to the purchase amount to an additional period of airtime; and enabling the telephonic means for telephonic communications during the additional period of airtime, independent of the subscribed periods of airtime.

BRIEF DESCRIPTION OF THE SEVERAL VIEWS OF THE DRAWING

The present invention will be understood more fully, while still further objects and advantages will become apparent, in the following detailed description of preferred embodiments of the invention illustrated in the accompanying drawing, in which.

DETAILED DESCRIPTION OF THE INVENTION

Figure 1:
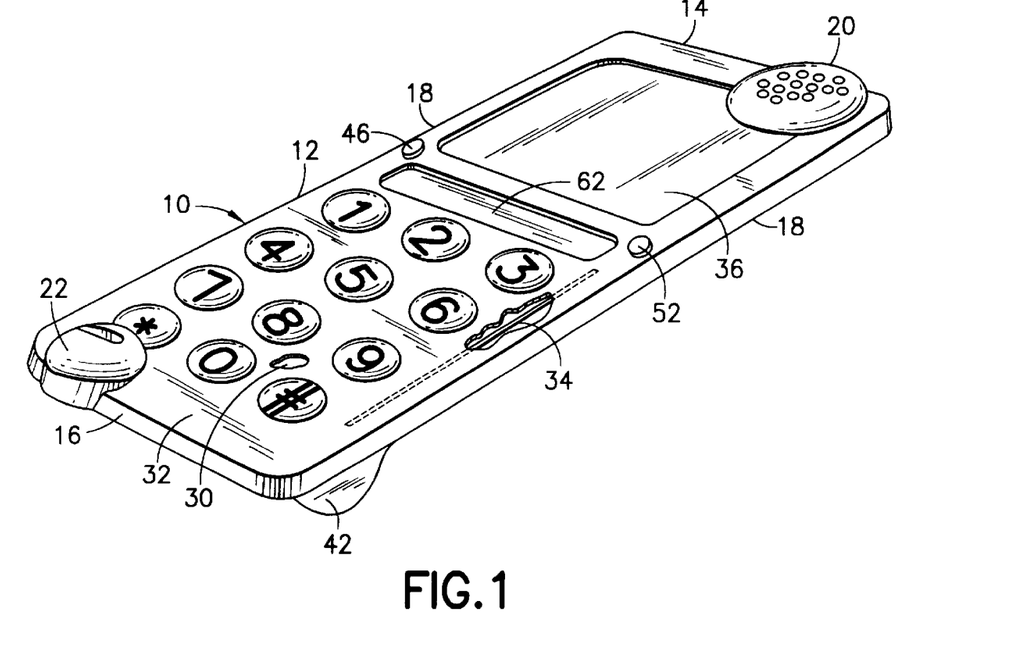
FIG. 1 is a front pictorial perspective view of a wireless telephone constructed in accordance with an embodiment the present invention.
Figure 2:
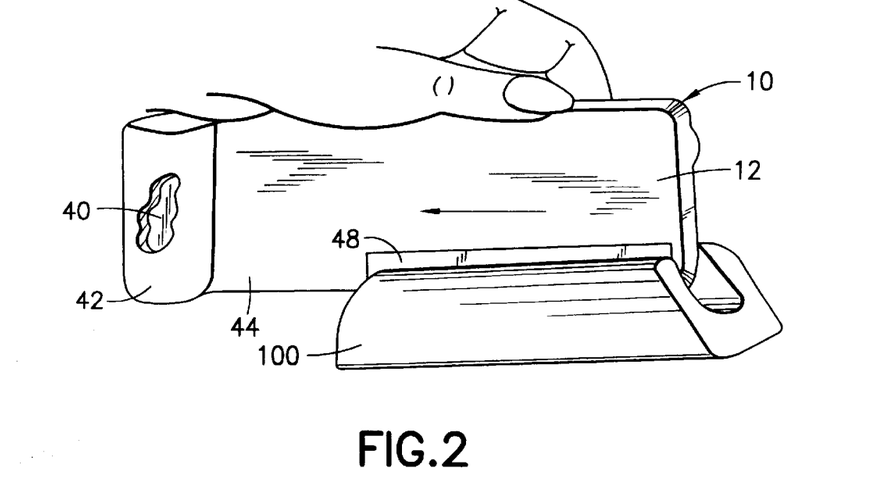
FIG. 2 is a rear pictorial view of the wireless telephone of FIG. 1, in use in accordance with an embodiment of the present invention.

Referring now to the drawing, and especially to FIGS. 1 and 2 thereof, a wireless telephone 10 is constructed in accordance with the invention and is seen to include an integrated body 12 extending longitudinally between a top end 14 and an opposite bottom end 16 and laterally between opposite sides 18. An earphone assembly 20 is connected to the body 12 at the top end 14, preferably offset toward one side 18 of the body 12, and a microphone assembly 22 is connected to the body 12 at the bottom end 16. A keypad 30 is placed beneath the front face 32 of the body 12, adjacent the bottom end 16, and an antenna 34 is embedded within the body 12 and extends longitudinally adjacent one of the sides 18. A logo area 36 is located at the front face 32. A power battery 40 is housed within a battery housing 42 attached to the body 12 at the rear face 44 of the body 12. A power switch 46 controls power from the power battery 40. The body 12 is relatively thin between the front face 32 and the rear face 44 and preferably includes a magnetic strip 48 along the rear face 44. The construction of body 12 provides the body 12 with a mechanical stiffness which enables the telephone 10 to be hand held during use in telephonic communication.

Figure 3:
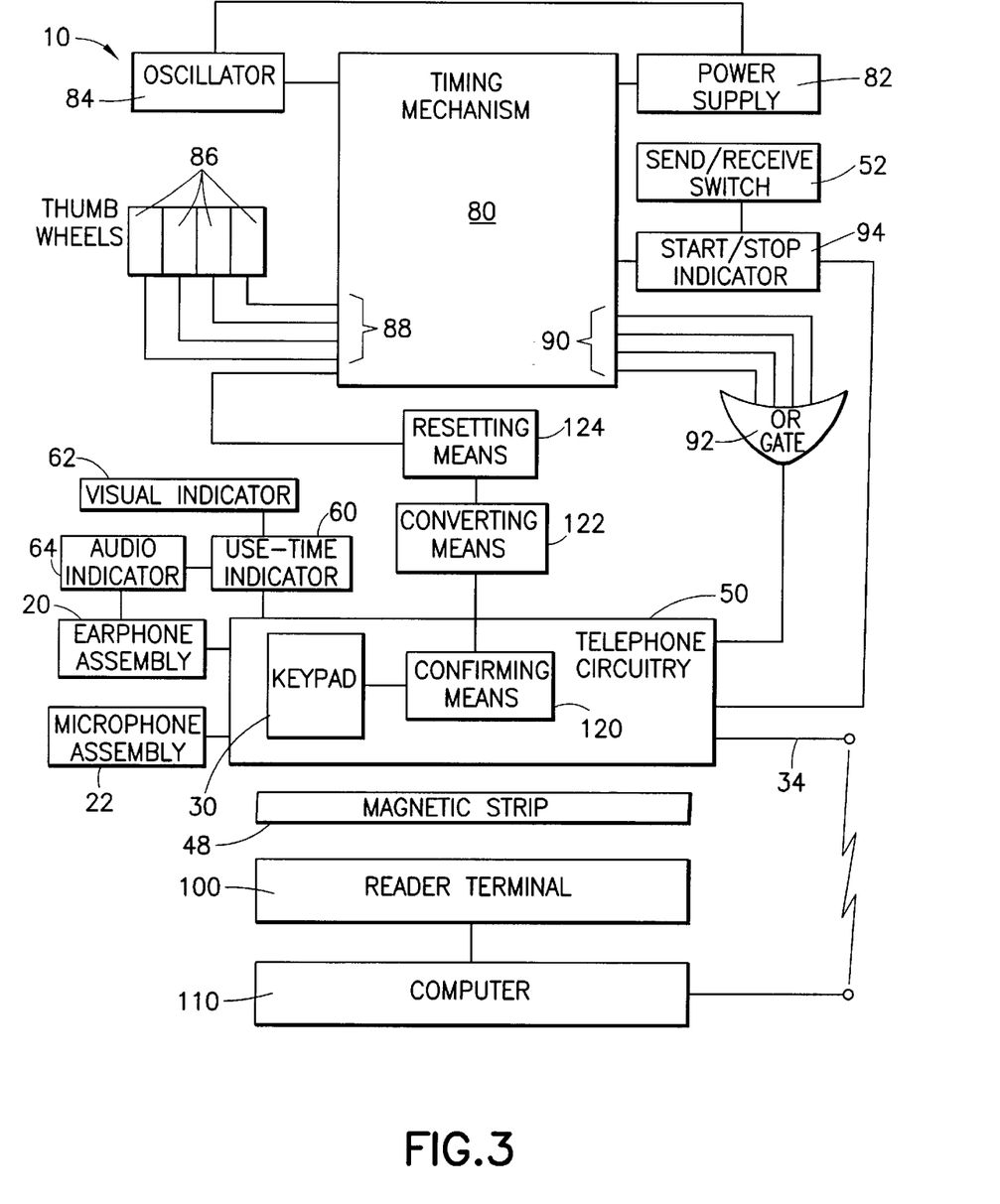
FIG. 3 is a diagrammatic depiction of a wireless telephone for use in accordance with the present invention.

Telephone 10 is supplied to a user with a predetermined, subscribed period of airtime and is capable of use only for the duration of the limited period of that supplied airtime, after which period telephone 10 is inoperative. To that end, telephone 10 includes component parts which enable only limited use. Referring now to FIG. 3, as well as to FIG. 1, the circuitry incorporated into telephone 10 is shown in diagrammatic fashion and is seen to include telephonic means in the form of conventional wireless telephone circuitry 50 for receiving and transmitting wireless telephonic communications.

Enabling/disabling means are incorporated for enabling telephonic communication for only a predetermined limited period of airtime, and disabling telephonic communication upon expiration of the predetermined limited period, whereby telephone 10 is rendered inoperative. In the embodiment illustrated in FIG. 3, telephone 10 includes selective operating means for operating the telephonic means for telephonic communications of selected durations. Thus, the selective operating means is shown in the form of a send/receive switch 52 selectively operated by the user of the telephone 10 to send a telephonic communication when a telephone call is to be made, and to terminate the telephonic communication when the call is complete. In this instance, switch 52 is actuated manually between an "on" mode and an "off" mode to effect a telephonic communication having a duration corresponding to the time during which switch 52 is in the "on" mode. With the power switch 46 turned on, power from the power battery 40 is supplied to the wireless telephonic circuitry 50. A use-time indicator 60 has a visual indicator 62 which displays the amount of airtime available for use and an audio indicator 64 which provides an audible warning that only a limited amount of airtime remains available.

Setting means is utilized for determining the duration of the predetermined limited period (airtime) over which the telephone 10 will be operative. The setting means includes a timing mechanism 80 powered continuously by a power supply 82 and connected to an oscillator 84, which also is powered by the power supply 82 and supplies the timing mechanism 80 with a timing signal. Selector means, shown in the form of manually operated thumb wheels 86, enable the input of a prescribed time into the timing mechanism 80, through input terminals 88. Output terminals 90 of the timing mechanism 80 are connected to the telephone circuitry 50 through an OR gate 92. A start/stop indicator 94 is responsive to the send/receive switch 52 such that upon the initiation of a telephone call, a start signal is provided to the timing mechanism 80 and upon completion of the telephone call, a stop signal is provided to the timing mechanism 80, enabling the timing mechanism 80, in concert with the oscillator 84, to count toward the prescribed time set into the timing mechanism 80 by the thumb wheels 86, for the duration of each telephone call, and thus compare the sum of the selected durations to the prescribed time set into the timing mechanism 80. When the sum of the durations of the telephone calls reaches the prescribed time set into the timing mechanism 80, the OR gate 92, which serves as a disabling means, discontinues power to the telephone circuitry 50, so that the telephone circuitry 50 will be disabled and telephone 10 will become inoperative.

Telephone 10 is constructed to be responsive to making selected purchases of goods and services in purchase amounts placed through a purchase account, such as a credit card account, and for enabling the purchase amounts made through the purchase account to be converted to additional periods of airtime during which telephonic communications are enabled independent of the predetermined subscribed period of airtime. Thus, magnetic strip 48 serves as identifying means and is encoded with information pertaining to the account number, name, address and other pertinent information which identifies the owner of the telephone 10 and the purchase account. A logo and other identifying indicia may be located in the logo area 36. As shown in FIG. 2, telephone 10 may be used in a manner similar to currently available credit cards to identify the user's credit card account and make a credit card purchase. Thus, telephone 10 is pulled through a magnetic strip reader in the form of a conventional reader terminal 100 which is connected to a central computer 110 (see FIG. 3), as in a conventional credit card purchase system. Once the purchase is made, the purchase amount is placed in the credit card account in the conventional manner and a receipt is issued to the purchaser. The receipt includes a transaction confirmation number. As an incentive to use the telephone 10 as a credit card for the purchase of goods or services, use of the telephone 10 for such purchases is converted into additional periods of airtime during which telephonic communication is enabled, independent of the original, or subscribed, period of airtime set into the telephone 10, as described above, the additional periods of airtime being related to the amounts of the purchases made using the purchase account. Accordingly, referring now to FIGS. 3 and 4, once a purchase is made and the purchase amount is entered into the credit card account, as set forth above, the user may communicate telephonically with the computer 110, entering an input code to access the computer 110, entering the user's credit card account number and any further identifying code necessary, such a personal identification number (PIN), the purchase amount and the transaction confirmation number, all with the keypad 30 serving as an input means. The computer 110 then will compare the purchase amount entered by the user to the debited purchase amount entered into the account when the purchase was made and, if the values are the same, will generate a confirming signal which is transmitted telephonically to a confirming means 120, which releases the value entered by the keypad 30 to a converting means 122 which is responsive to the confirming means to convert the purchase amount entered through the keypad 30 to an additional period of airtime, preferably in proportion to the value of the purchase amount. A resetting means 124 is responsive to the converting means 122 to reset the timing mechanism 80 by the amount of the additional period of airtime. In this manner, the keypad 30 and the confirming means 120 serve as purchase amount means for entering information pertaining to a purchase amount which serves as the basis for providing additional duration added to the predetermined limited period originally set into the timing mechanism 80 and the telephone 10 is provided with additional usable airtime in proportion to the purchase amount of purchases made through the credit card account, thereby providing an incentive to use the credit card account identified in the magnetic strip 48 of the telephone 10.

Figure 4:
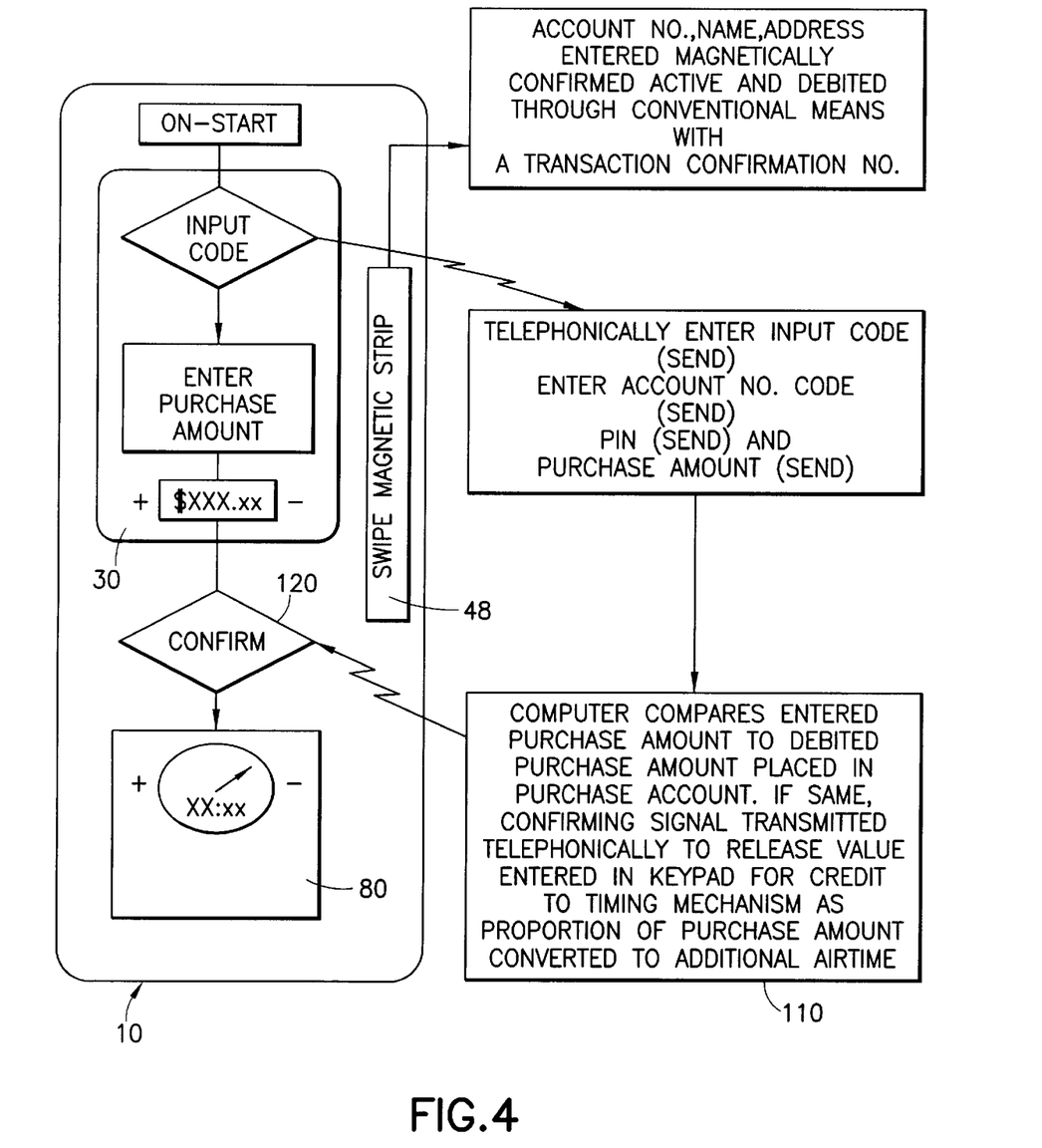
FIG. 4 is a schematic depiction describing the use of the wireless telephone of FIG. 3.

Should any purchase be returned for credit, no credit would be issued to the credit card account without a communication between the telephone 10 and the computer 110 as a result of which communication the timing mechanism 80 is reset again to delete the period of airtime previously added by virtue of having made the purchase. Should any or all of the additional period of airtime be used prior to the return of a purchase for credit, the credit card account merely would be charged with the amount of additional airtime used.

Figure 5:
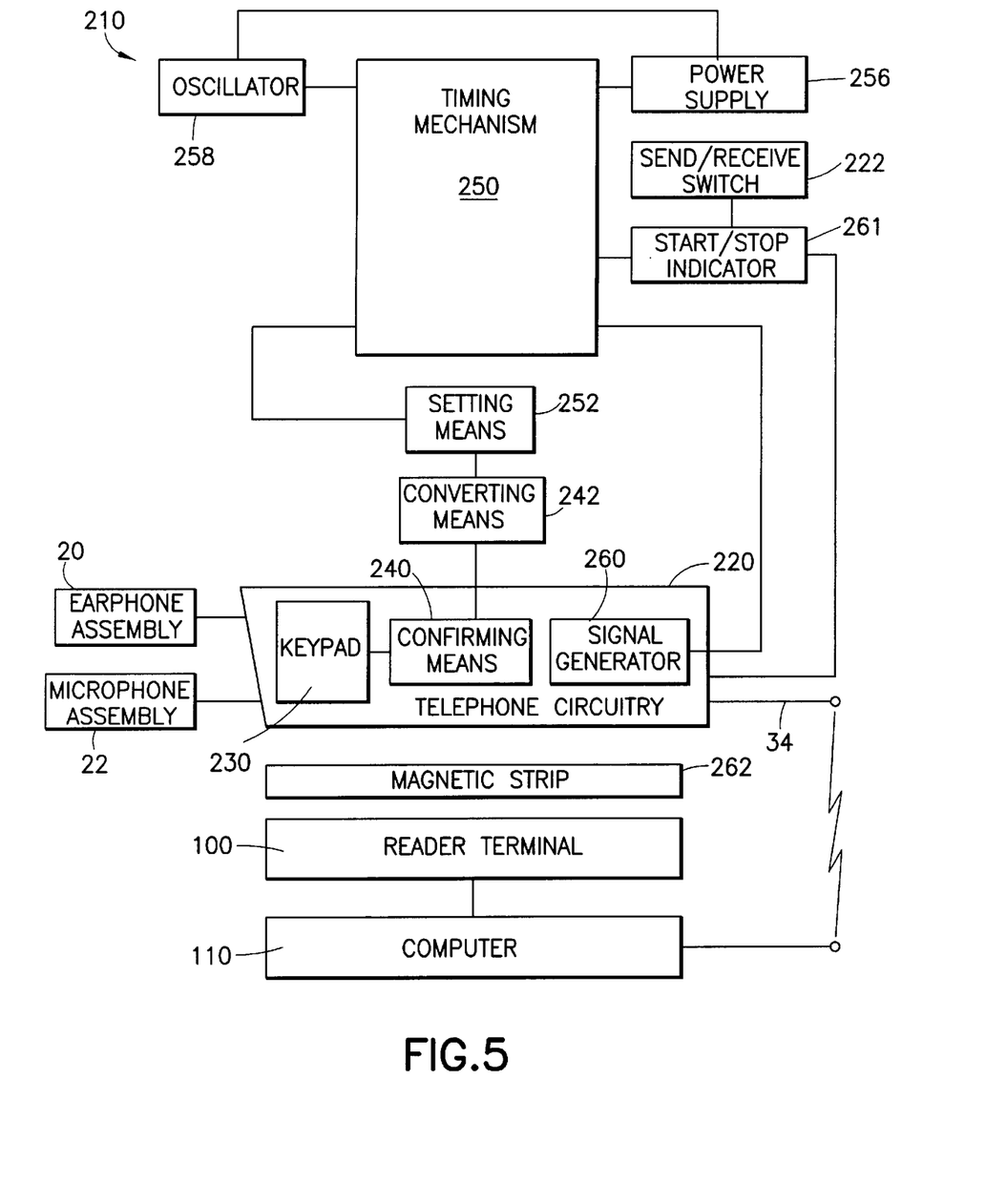
FIG. 5 is a diagrammatic depiction of another wireless telephone for use in accordance with another embodiment of the present invention.
Figure 6:
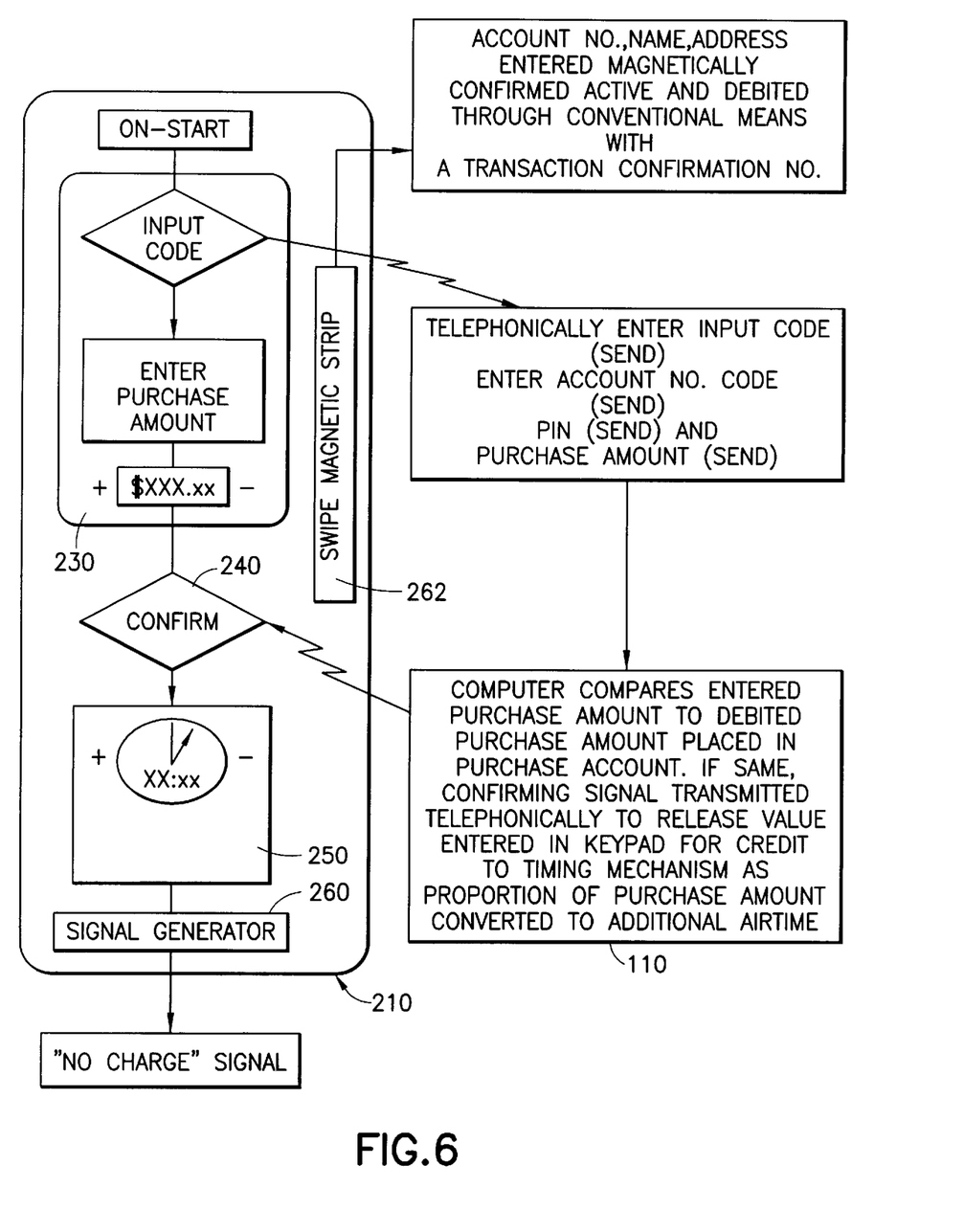
FIG. 6 is a schematic depiction describing the use of the wireless telephone of FIG. 5.

Turning now to FIGS. 5 and 6, another wireless telephone for use in accordance with the present invention is illustrated at 210 diagrammatically in FIG. 5 and schematically in FIG. 6. Telephone 210 is of the type used in connection with a subscription service in which airtime is monitored and is charged to a subscriber's account as used. Telephone 210 includes telephonic means in the form of conventional wireless telephone circuitry 220 for receiving and transmitting wireless telephonic communications and selective operating means for operating the telephonic means for telephonic communications of selected durations. Thus, the selective operating means is shown in the form of a send/receive switch 222 selectively operated by the user of the telephone 210 to send a telephonic communication when a telephone call is to be made, and to terminate the telephonic communication when the call is complete.

In a manner similar to that described above in connection with telephone 10, as an incentive to use the telephone 210 as a credit card for the purchase of goods or services, use of the telephone 210 for such purchases is converted into additional periods of airtime during which telephonic communication is enabled, independent of subscribed periods of airtime charged by the telephone subscription service, the additional periods of airtime being related to the amounts of the purchases made using the purchase account. Accordingly, once a purchase is made and the purchase amount is entered into the credit card account, as set forth above, the user may communicate telephonically with computer 110, as before, entering an input code to access the computer 110, entering the user's credit card account number and any further identifying code necessary, such as a personal identification number (PIN), the purchase amount and the transaction confirmation number, all with a keypad 230 serving as an input means. The computer 110 then will compare the purchase amount entered by the user to the debited purchase amount entered into the account when the purchase was made and, if the values are the same, will generate a confirming signal which is transmitted telephonically to a confirming means 240, which releases the value entered by the keypad 230 to a converting means 242 which is responsive to the confirming means 240 to convert the purchase amount entered through the keypad 230 to an additional period of airtime, preferably in proportion to the value of the purchase amount.

An accumulator means in the form a timing mechanism 250 is responsive to the converting means 242 through a setting means 252 to set into the timing mechanism 250 the duration of each additional period of airtime. Timing mechanism 250 is powered by a power supply 256 and is operated in conjunction with an oscillator 258, also powered by power supply 256. Indicator means in the form of a signal generator 260 is responsive to the timing mechanism 250 so that upon the initiation of a telephonic communication, through actuation of the send/receive switch 222, and a start/stop indicator 261 responsive to send/receive switch 222, the signal generator 260 generates a "no charge" signal for a duration related to the value accumulated in the timing mechanism 250. The signal is transmitted through the telephone 210 to the monitoring system and is interpreted by the monitoring system as "free" airtime; that is, as long as the "no charge" signal is present, the monitoring system will assure that no charge is made by the subscription service for airtime. In this manner the keypad 230 and the confirming means 240 serve as purchase amount means for entering information pertaining to a purchase amount which serves as the basis for providing additional duration added to telephonic communication independent of the periods of airtime subscribed through the subscription service, the additional duration being in proportion to the purchase amounts made through the credit card account, thereby providing an incentive to use the credit card account identified in a magnetic strip 262 of the telephone 210.

It will be seen that the present invention attains the several objects and advantages summarized above; namely: Combines the convenience and versatility of credit card use with the use of wireless telephonic communications; provides wireless telephone users with increased airtime in proportion to the use of purchase accounts, such as credit card accounts, for the purchase goods and services; enables more convenience and increased versatility in the use of wireless telephonic equipment, with lower cost; encourages the purchase of goods and services through the use of credit or debit accounts by conveniently crediting added airtime for wireless telephonic communications in proportion to such credit or debit account purchases; reduces the number of separate devices carried by consumers having credit card accounts and wireless telephones by combining the capabilities of a wireless telephone and a credit card into a single, conveniently carried device; reduces the cost to consumers of wireless telephonic communications; makes available the use of wireless telephonic communications to a wider audience of consumers and, in particular, to consumers already accustomed to using credit purchase accounts; enables the convenient use of pre-paid periods of airtime in connection with wireless telephonic communications; fosters the growth of commerce in goods and services, with increased communication through wireless communication services.

It is to be understood that the above detailed description of preferred embodiments of the invention is provided by way of example only. Various details of design, construction and procedure may be modified without departing from the true spirit and scope of the invention, as set forth in the appended claims.

The embodiments of the invention in which an exclusive property or privilege is claimed are defined as follows:

1. A wireless telephone for telephonic communications during subscribed periods of airtime and responsive to making selected purchases of goods and services in purchase amounts placed through a purchase account and for enabling the purchase amounts made through the purchase account to be converted to additional periods of airtime during which telephonic communications are enabled independent of the subscribed periods of airtime, the telephone comprising:

telephonic means for transmitting and receiving telephonic communications;

input means for entering information pertaining to a purchase amount of a selected purchase;

confirming means for confirming placement of the purchase amount in the purchase account;

converting means responsive to the confirming means for converting the purchase amount confirmed by the confirming means to an additional period of airtime, in proportion to the purchase amount of the selected purchase, during which additional period of airtime telephonic communication is enabled independent of the subscribed periods of airtime;

enabling/disabling means for enabling the telephonic means for telephonic communications during a predetermined limited subscribed period and disabling the telephonic means upon expiration of the predetermined limited subscribed period; and selective operating means for operating the telephonic means for telephonic communications of selected durations, the enabling/disabling means being responsive to the selective operating means such that telephonic communication is disabled for telephonic communications when the sum of the selected durations reaches the predetermined limited period; and resetting means responsive to the converting means for adding the additional period of airtime to the predetermined limited period.

2. The invention of claim 1 wherein the enabling/disabling means includes setting means for determining the duration of the predetermined limited period, and disabling means for rendering the telephonic means inoperative in response to the sum of the selected durations reaching the duration of the predetermined limited period, the resetting means being responsive to the converting means for adding additional duration to the predetermined limited period.

3. The invention of claim 2 wherein the setting means includes a timing mechanism, and the resetting means is responsive to the converting means to reset the timing mechanism.

4. A wireless telephone for telephonic communications during subscribed periods of airtime and responsive to making selected purchases of goods and services in purchase amounts placed through a purchase account and for enabling the purchase amounts made through the purchase account to be converted to additional periods of airtime during which telephonic communications are enabled independent of the subscribed periods of airtime, the telephone comprising:

telephonic means for transmitting and receiving telephonic communications;

input means for entering information pertaining to a purchase amount of a selected purchase;

confirming means for confirming placement of the purchase amount in the purchase account;

converting means responsive to the confirming means for converting the purchase amount confirmed by the confirming means to an additional period of airtime, in proportion to the purchase amount of the selected purchase, during which additional period of airtime telephonic communication is enabled independent of the subscribed periods of airtime;

accumulator means responsive to the converting means for accumulating additional periods of airtime, as determined by the converting means, to establish an additional duration; and indicator means responsive to the accumulator means for indicating during telephonic communications, for the additional duration, the additional periods of airtime, whereby telephonic communication is enabled for the duration of the accumulated additional periods of airtime independent of the subscribed periods of airtime;

the accumulator means including a timing mechanism, and the indicator means including a signal generator for generating a signal during telephonic communications, the signal being indicative of the additional periods of airtime.

5. The invention of claim 2 wherein the telephone includes identifying means for identifying the purchase account through which the selected purchases are made.

6. A method of using a wireless telephone for telephonic communications during subscribed periods of airtime and for making selected purchases of goods and services in purchase amounts placed through a purchase account, the method enabling the purchase amounts of the selected purchases to be converted to additional periods of airtime during which telephonic communications are enabled independent of the subscribed periods of airtime, in response to making the selected purchases, the method comprising:

providing telephonic means for transmitting and receiving telephonic communications:

placing a purchase amount in the purchase account;

entering information pertaining to a purchase amount of a selected purchase;

confirming placement of the information pertaining to the purchase amount in the purchase account;

converting the purchase amount, confirmed as having been placed in the purchase account, to an additional period of airtime, in proportion to the purchase amount;

enabling the telephonic means for telephonic communications during the additional period of airtime, independent of the subscribed periods of airtime;

enabling the telephonic means for telephonic communications during a predetermined limited subscribed period and disabling the telephonic means upon expiration of the predetermined limited subscribed period;

operating the telephonic means for telephonic communications of selected durations such that telephonic communication is disabled for telephonic communications when the sum of the selected durations reaches the predetermined limited period; and adding the additional period of airtime to the predetermined limited period.

7. A method of using a wireless telephone for telephonic communications during subscribed periods of airtime and for making selected purchases of goods and services in purchase amounts placed through a purchase account, the method enabling the purchase amounts of the selected purchases to be converted to additional periods of airtime during which telephonic communications are enabled independent of the subscribed periods of airtime, in response to making the selected purchases, the method comprising:

providing telephonic means for transmitting and receiving telephonic communications;

placing a purchase amount in the purchase account;

entering information pertaining to a purchase amount of a selected purchase;

confirming placement of the information pertaining to the purchase amount in the purchase account;

converting the purchase amount, confirmed as having been placed in the purchase account, to an additional period of airtime, in proportion to the purchase amount;

enabling the telephonic means for telephonic communications during the additional period of airtime, independent of the subscribed periods of airtime;

accumulating additional periods of airtime to establish an additional duration; and indicating during telephonic communications, for the additional duration, the additional periods of airtime, whereby telephonic communication is enabled for the duration of the accumulated additional periods of airtime independent of the subscribed periods of airtime.

8. The invention of claim 7 including generating a signal during telephonic communications, the signal being indicative of the additional periods of airtime.

9. A wireless telephone for telephonic communications during subscribed periods of airtime and responsive to purchase amounts so as to enable the purchase amounts to be converted to additional periods of airtime during which telephonic communications are enabled independent of the subscribed periods of airtime, the telephone comprising:

telephonic means for transmitting and receiving telephonic communications;

purchase amount means for entering information pertaining to a purchase amount;

converting means responsive to the purchase amount means for converting the information pertaining to the purchase amount to an additional period of airtime during which additional period of airtime telephonic communication is enabled independent of the subscribed periods of airtime;

enabling/disabling means for enabling the telephonic means for telephonic communications during a predetermined limited subscribed period and disabling the telephonic means upon expiration of the predetermined limited subscribed period;

selective operating means for operating the telephonic means for telephonic communications of selected durations, the enabling/disabling means being responsive to the selective operating means such that telephonic communication is disabled for telephonic communications when the sum of the selected durations reaches the predetermined limited period; and resetting means responsive to the converting means for adding the additional period of airtime to the predetermined limited period.

10. The invention of claim 9 wherein the enabling/disabling means includes setting means for determining the duration of the predetermined limited period, and disabling means for rendering the telephonic means inoperative in response to the sum of the selected durations reaching the duration of the predetermined limited period, the resetting means being responsive to the converting means for adding additional duration to the predetermined limited period.

11. The invention of claim 10 wherein the setting means includes a timing mechanism, and the resetting means is responsive to the converting means to reset the timing mechanism.

12. A wireless telephone for telephonic communications during subscribed periods of airtime and responsive to purchase amounts so as to enable the purchase amounts to be converted to additional periods of airtime during which telephonic communications are enabled independent of the subscribed periods of airtime, the telephone comprising:

telephonic means for transmitting and receiving telephonic communications;

purchase amount means for entering information pertaining to a purchase amount;

converting means responsive to the purchase amount means for converting the information pertaining to the purchase amount to an additional period of airtime during which additional period of airtime telephonic communication is enabled independent of the subscribed periods of airtime;

accumulator means responsive to the converting means for accumulating additional periods of airtime, as determined by the converting means, to establish an additional duration; and indicator means responsive to the accumulator means for indicating during telephonic communications, for the additional duration, the additional periods of airtime, whereby telephonic communication is enabled for the duration of the accumulated additional periods of airtime independent of the subscribed periods of airtime;

the accumulator means including a timing mechanism, and the indicator means including a signal generator for generating a signal during telephonic communications, the signal being indicative of the additional periods of airtime.

13. A wireless telephone for telephonic communications during subscribed periods of airtime and responsive to purchase amounts so as to enable the purchase amounts to be converted to additional periods of airtime during which telephonic communications are enabled independent of the subscribed periods of airtime, the purchase amounts being placed through a purchase account, the telephone comprising:

telephonic means for transmitting and receiving telephonic communications;

purchase amount means for entering information pertaining to a purchase amount;

converting means responsive to the purchase amount means for converting the information pertaining to the purchase amount to an additional period of airtime during which additional period of airtime telephonic communication is enabled independent of the subscribed periods of airtime; and the purchase amount means including:

input means for entering the information pertaining to the purchase amount; and confirming means for confirming placement of the purchase amount in the purchase account and indicating a confirmed purchase amount;

the converting means being responsive to the confirming means for converting the information pertaining to the purchase amount confirmed by the confirming means to the additional period of airtime.

14. A method of using a wireless telephone for telephonic communications during subscribed periods of airtime and responsive to purchase amounts so as to enable the purchase amounts to be converted to additional periods of airtime during which telephonic communications are enabled independent of the subscribed periods of airtime, the method comprising:

providing telephonic means for transmitting and receiving telephonic communications;

entering information pertaining to a purchase amount;

converting the information pertaining to the purchase amount to an additional period of airtime;

enabling the telephonic means for telephonic communications during the additional period of airtime, independent of the subscribed periods of airtime;

accumulating additional periods of airtime to establish an additional duration; and indicating during telephonic communications, for the additional duration, the additional periods of airtime, whereby telephonic communication is enabled for the duration of the accumulated additional periods of airtime independent of the subscribed periods of airtime.

15. The invention of claim 14 including generating a signal during telephonic communications, the signal being indicative of the additional periods of airtime.

* * * * *